United States Patent
Wagner et al.

(10) Patent No.: US 10,303,492 B1
(45) Date of Patent: May 28, 2019

(54) MANAGING CUSTOM RUNTIMES IN AN ON-DEMAND CODE EXECUTION SYSTEM

(71) Applicant: Amazon Technologies, Inc., Seattle, WA (US)

(72) Inventors: Timothy Allen Wagner, Seattle, WA (US); Marc John Brooker, Seattle, WA (US); Bryan Nicholas Moffatt, Seattle, WA (US); Robison Rodrigues dos Santos, Seattle, WA (US); Niranjan Jayakar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/841,132

(22) Filed: Dec. 13, 2017

(51) Int. Cl.
| | |
|---|---|
| G06F 9/44 | (2018.01) |
| G06F 9/445 | (2018.01) |
| G06F 8/41 | (2018.01) |
| G06F 9/54 | (2006.01) |

(52) U.S. Cl.
CPC ............ *G06F 9/44568* (2013.01); *G06F 8/41* (2013.01); *G06F 9/54* (2013.01)

(58) Field of Classification Search
None
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |
| 5,970,488 A | 10/1999 | Crowe et al. |
| 6,708,276 B1 | 3/2004 | Yarsa et al. |
| 7,036,121 B1 | 4/2006 | Casabona et al. |

(Continued)

FOREIGN PATENT DOCUMENTS

| | | |
|---|---|---|
| EP | 2663052 A1 | 11/2013 |
| WO | WO 2009/137567 A1 | 11/2009 |

(Continued)

OTHER PUBLICATIONS

Anonymous: "Docker run reference", Dec. 7, 2015, XP055350246, Retrieved from the Internet:URL:https://web.archive.org/web/20151207111702/https:/docs.docker.com/engine/reference/run/ [retrieved on Feb. 28, 2017].

(Continued)

*Primary Examiner* — Qamrun Nahar
(74) *Attorney, Agent, or Firm* — Knobbe, Martens, Olson & Bear, LLP

(57) ABSTRACT

Systems and methods are described for managing provisioning of runtimes to execution environments within an on-demand code execution system. Different runtimes can include various software enabling execution of user-submitted code within the on-demand code execution system, potentially written in different programming languages. Each runtime can implement a pull-based request handler, such that when the runtime is provisioned within an execution environment, the runtime requests execution instructions from a management system on the on-demand code execution system. The management system can maintain a queue of execution instructions for each runtime, and can use a depth of each queue to manage the provisioning of environments with runtimes.

20 Claims, 6 Drawing Sheets

(56) References Cited

U.S. PATENT DOCUMENTS

| | | |
|---|---|---|
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,336,079 B2 | 12/2012 | Budko et al. |
| 8,429,282 B1 | 4/2013 | Ahuja |
| 8,448,165 B1 | 5/2013 | Conover |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,806,468 B2 | 8/2014 | Meijer et al. |
| 8,819,679 B2 | 8/2014 | Agarwal et al. |
| 8,825,964 B1 | 9/2014 | Sopka et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 7/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 * | 12/2015 | Orveillon ................. G06F 8/63 |
| 9,223,966 B1 | 12/2015 | Satish et al. |
| 9,317,689 B2 * | 4/2016 | Aissi ..................... G06F 9/445 |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 2002/0172273 A1 | 11/2002 | Baker et al. |
| 2003/0071842 A1 | 4/2003 | King et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kim Brel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0255604 A1 | 11/2007 | Seelig |
| 2008/0028409 A1 | 1/2008 | Cherkasova et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Amir Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0184993 A1 | 7/2011 | Chawla et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096271 A1 | 4/2012 | Ramarathinam et al. |
| 2012/0096468 A1 | 4/2012 | Chakravorty et al. |
| 2012/0102307 A1 | 4/2012 | Wong |

(56) References Cited

U.S. PATENT DOCUMENTS

| | | |
|---|---|---|
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0263117 A1 | 10/2013 | Konik et al. |
| 2013/0275975 A1 | 10/2013 | Masuda et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378764 A1 | 12/2015 | Sivasubramanian et al. |
| 2015/0378765 A1 | 12/2015 | Singh et al. |
| 2016/0012099 A1 | 1/2016 | Tuatini et al. |
| 2016/0072727 A1 | 3/2016 | Leafe et al. |
| 2016/0098285 A1 | 4/2016 | Davis et al. |
| 2016/0100036 A1 | 4/2016 | Lo et al. |
| 2016/0140180 A1 | 5/2016 | Park et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0301739 A1 | 10/2016 | Thompson |
| 2016/0364265 A1 | 12/2016 | Cao et al. |
| 2016/0371127 A1 | 12/2016 | Antony et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |

FOREIGN PATENT DOCUMENTS

| | | |
|---|---|---|
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

(56) References Cited

OTHER PUBLICATIONS

Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Dombrowski, M., et al., Dynamic Monitor Allocation in the Java Virtual Machine, JTRES '13, Oct. 9-11, 2013, pp. 30-37.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Hoffman, Auto scaling your website with Amazon Web Services (AWS)—Part 2, Cardinalpath, Sep. 2015, 15 pages.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Shim (computing), Wikipedia, https://en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
International Search Report and Written Opinion in PCT/US2015/052838 dated Dec. 18, 2015.
International Preliminary Report on Patentability in PCT/US2015/052838 dated Apr. 4, 2017.
International Search Report and Written Opinion in PCT/US2015/052833 dated Jan. 13, 2016.
International Preliminary Report on Patentability in PCT/US2015/052833 dated Apr. 4, 2017.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Search Report and Written Opinion in PCT/US2016/066997 dated Mar. 20, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.

\* cited by examiner

MANAGING CUSTOM RUNTIMES IN AN ON-DEMAND CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
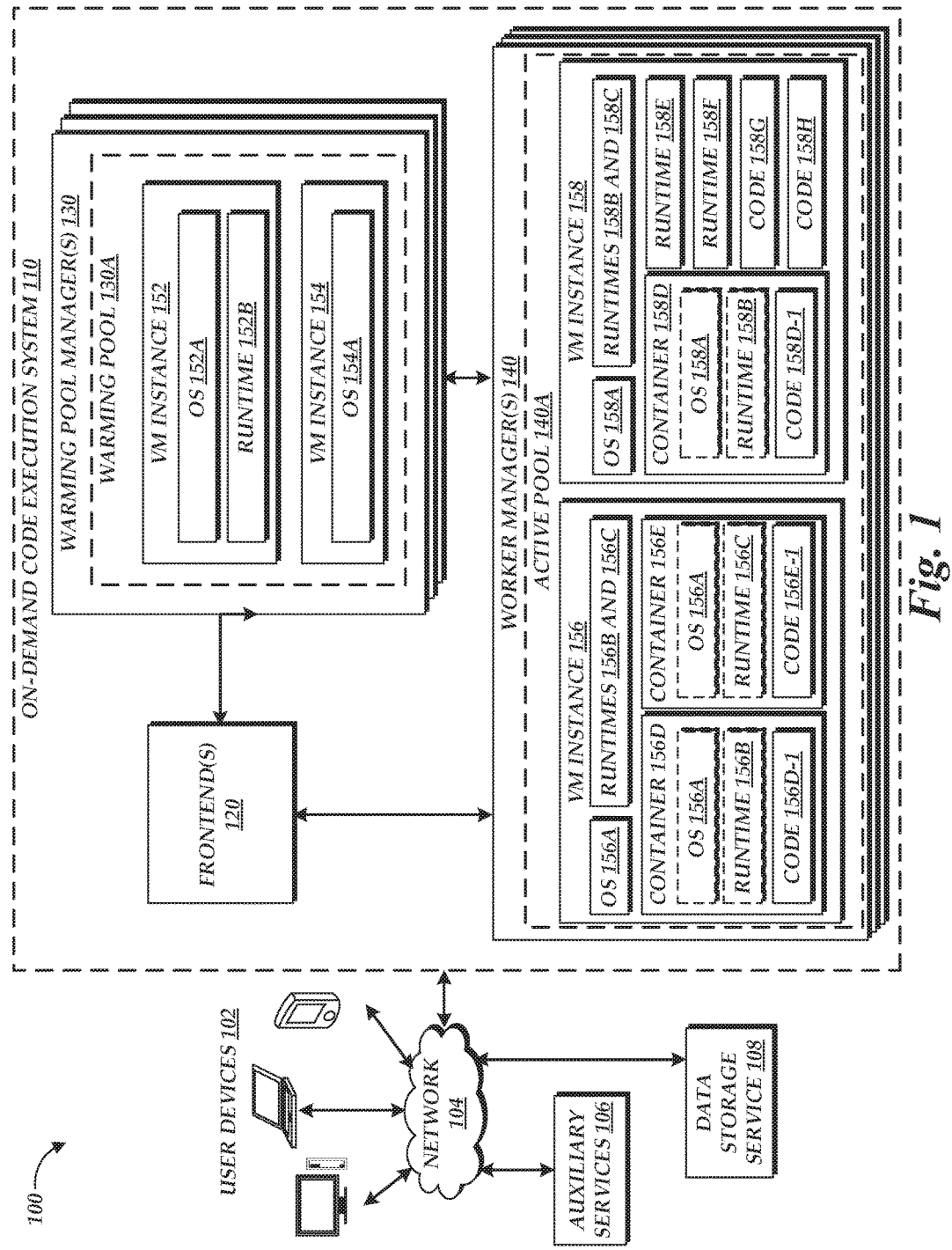
FIG. 1 is a block diagram depicting an illustrative environment in which an on-demand code execution system can operate to execute tasks corresponding to code, which may be submitted by users of the on-demand code execution system, within an environment provisioned with a runtime, which may also be submitted by users of the on-demand code execution system.

Generally described, aspects of the present disclosure relate to an on-demand code execution system. The on-demand code execution system enables rapid execution of code, which may be supplied by users of the on-demand code execution system. Moreover, in accordance with embodiments of the present disclosure, the on-demand code execution system can enable execution of code in a user-created runtime environment, such as an environment supporting a user-preferred coding language. The on-demand code execution system can further manage provisioning of execution environments within the system with user-created runtimes to facilitate rapid execution of code in the user-preferred coding language. In one embodiment, each user-created runtime may implement a pull-based request handler, which interfaces with the on-demand code execution system to retrieve requests for execution of code. The on-demand code execution system may maintain queues into which execution requests are placed prior to distribution to an environment with an appropriate user-created runtime. By monitoring a depth of queue for a given user-created runtime, the on-demand code execution system may determine a supply level for the runtime relative to a rate of requests to execute code within that runtime. Thereafter, the on-demand code execution system may modify a number or proportion of environments on the on-demand code execution system provisioned with the runtime, in order to facilitate rapid demand of code under the runtime. In some embodiments, the pull-based request handler may be implemented by a library or other module provided by the on-demand code execution system, based on functionality common across a number of different programming languages (such as handling of hypertext transport protocol ["HTTP"] requests). Thus, the on-demand code execution system can enable creation and submission of a user-created runtime with little or no knowledge as to the operation of the on-demand code execution system itself, and without a requirement on the user-created runtime to manage aspects of that operation, such as the queuing of requests for execution, management of available environments, and the like.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "realtime" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

One approach to enabling execution of tasks within an on-demand code execution system is to require the tasks to be executable within a defined runtime environment, such as an environment supporting execution of code in a specific programming language (e.g., the PYTHON™ language). Because many programming languages support cross-language calls (e.g., via execution of subprocesses, execution of system-level shell commands, or the like), such tasks might not be limited to code written in that specific programming language. However, under such an approach, tasks may be required to ultimately be rooted in code executable by the specific programming language, even when such code is used only to "bootstrap" code of a different language. This approach may simplify operation of the on-demand code execution system, since a variety of environments can be maintained including a runtime for the specified programming language, and each task may execute in any such runtime. However, this approach may also create inefficiencies within the on-demand code execution system, since use of a first language to bootstrap execution of code of a different language may be inefficient, as compared to executing the code of the different language directly within a runtime supporting that different language. Moreover, this approach may also present difficulties to end users, since each task might be required to be created with the specific programming language in mind. For example, an end user creating a task may be required to create or implement a bootstrapper from the specific programming language implemented natively on the on-demand code execution system to their desired programming language.

To address this, it may be desirable for the on-demand code execution system to "natively" support multiple programming languages, such that code of the languages may be executed directly within an execution environment (e.g., without use of a bootstrapper of another language). While it may be possible for the on-demand code execution system to be manually configured to support multiple languages, such manual configuration may require significant effort on the part of an administrator of the on-demand code execution system to provide support for each language. For example, each language may be required to implement various functionalities of the on-demand code execution system, such as reception of requests to execute tasks, queueing of those requests, reporting of results of execution, logging, and the like. Given the wide variety of languages available, and the rapid rate of introduction of new languages, it is therefore desirable to enable support of new runtimes (such as those supporting new languages), through a standardized interface that requires little or no knowledge or support, within the runtime, for how various functionalities of the on-demand code execution system are implemented. Illustratively, the use of such a standardized interface may enable user-submission of new runtimes to the on-demand code execution system.

Support for multiple different runtimes at the on-demand code execution system may create technical challenges on the on-demand code execution system. For example, as noted above, where the on-demand code execution system supports only a single native runtime (e.g., supporting a specific programming language), the on-demand code execution system may be configured to maintain a pool of environments supporting that runtime, such that tasks can be rapidly executed within the runtime. Because only a single native runtime is required, all environments can be provisioned with the runtime, and the on-demand code execution system may be required only to ensure that a sufficient number of environments exist at any given time to execute tasks. Introduction of new runtimes complicates this process, as in addition to ensuring that a sufficient number of environments exist to fulfill requests, the on-demand code execution system may be required to ensure that those environments are provisioned with a correct runtime for the requests. While it may be possible to independently manage a pool of environments for each runtime (e.g., by creating and destroying environments for each runtime according to need for that runtime), such action may increase the complexity of operation of the on-demand code execution system, while also reducing its efficiency. For example, the on-demand code execution system may implement environments within a hosted computing environment (or "cloud" environment) that provides an interface through which new environments may be dynamically created or destroyed. If the on-demand code execution system maintains a pool of environments for each runtime, each pool may be required to separately interact with this interface, increasing the number of calls to the interface and the complexity of managing the on-demand code execution system. Moreover, if in this scenario the need for two different pools of environments shifts in opposite directions (e.g., a need for environments of one runtime increasing while a need for environments of another runtime decreasing), excessive calls to the interface may be generated (e.g., near simultaneous calls to both create and destroy environments) leading to a reduction in operating efficiency of the system.

Thus, in accordance with embodiments of the present disclosure, the on-demand code execution system is to maintain a single pool of available environments (e.g., created or destroyed according to a volume of requests to execute tasks generally), and to provision those environments with various runtimes according to a demand for each runtime. Thus, the management of a number of environments may be divided from the management of which runtimes are provisioned on those environments, simplifying operation of the on-demand code execution system and reducing unnecessary calls to a hosted computing environment. More specifically, and as described in detail below, the proportion of available environments provisioned with various runtimes may be determined according to a depth of a logical queue associated with each runtime, and without requiring any individual runtime to itself implement functionality for monitoring a workload associated with the runtime. While illustrative examples are provided herein with reference to a queue for a given runtime, in some embodiments, the on-demand code execution system may maintain multiple queues for a given runtime. For example, a queue may be maintained for each unique combination of runtime and task that depends on the runtime. Thus, references to a queue for a given runtime may be understood to encompass one or more queues for the runtime, each of which may be associated with the runtime and one or more additional criteria (e.g., a specific task, a specific user, a group of tasks or users, etc.).

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, limited nature of compute resources with which to execute code, the inefficiency of execution of code within a single runtime environment, and the difficulty in rapidly and efficiently managing a pool of available environments when multiple runtimes are supported in such environments. These technical problems are addressed by the various technical solutions described herein, including the implementation of an on-demand code execution system that enables provisioning of environments with a variety of runtimes without requiring the runtime to implement various functionalities of the on-demand code execution system (such as queueing, scheduling, reporting, etc.), and that enables proportioning of runtimes among a set of available environments according to a demand for such runtimes, independently of the managing the number of available environments. Thus, the present disclosure represents an improvement on existing data processing systems and computing systems in general.

The general execution of tasks on the on-demand code execution system will now be discussed. Specifically, to execute tasks, the on-demand code execution system described herein may maintain a pool of pre-initialized virtual machine instances or other execution environments that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store user-submitted runtimes to be provisioned into an execution environment, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, the tasks established by a user may correspond to code executable to implement "map" and "reduce" functions with respect to a data set.

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters)

included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 may further provide, or enable user submission of, various different runtimes (e.g., supporting various different programming languages). Illustratively, where a user wishes the on-demand code execution system 110 to execute a task written in the Ruby programming language, but the on-demand code execution system 110 does not currently support such a language, the user may submit a runtime enabling execution of code written in the Ruby language. That runtime may include, for example, a ruby interpreter formatted for execution within an operating system implemented by the on-demand code execution system 110 (e.g., Linux). In some instances, the on-demand code execution system 110 may provide libraries or modules formatted for use in a variety of programming languages, which implement various functionalities of execution environments within the on-demand code execution system 110 (e.g., retrieval of a task, execution of code of the task, reporting of results, etc.). Thus, a user may include a relatively small amount of code within the desired programming language in order to implement such libraries or modules. Thereafter, the on-demand code execution system 110 may enable the user to submit tasks written in the desired programming language, which the on-demand code execution system 110 may execute within an execution environment provisioned with the user-submitted runtime. In some instances, in addition or as an alternative to providing libraries or modules, the on-demand code execution system 110 may provide a specification for implementing functionalities of execution environments within the on-demand code execution system 110 (e.g., retrieval of a task, execution of code of the task, reporting of results, etc.). The specification may, for example, require use of a widely available communication protocol, such as the HTTP protocol, to implement these functionalities. For example, the specification may specify an application programming interface (API) through which information corresponding to these functionalities is retrieved, and specify various aspects of the functionalities (e.g., a time to complete each functionality). In one embodiment, the API may be designed as a representational state transfer (REST) architecture API. The prevalence of a widely available communication protocol may enable rapid development of user-submitted runtimes according to the specification.

As used herein, "runtime" is intended to refer to a collection of software enabling execution of user-submitted code (e.g., on a device of the on-demand code execution system 110, such as a virtual machine running a Linux operating system). The collection of software may include, for example, one or more executables, compilers, interpreters, drivers, software development kits (SDKs), libraries, modules, or the like, which facilitate execution of code. A runtime may support execution of code within more than one language. For example, a given runtime may include software enabling execution of both Python- and C++-language code. Moreover, multiple runtimes may be created supporting execution of code within a given language. For example, a first runtime may support execution of code written in the Python language, while a second runtime supports execution of code written for use with the "SciPy" programming language, built using the Python language. Thus, various runtimes may be created to facilitate expected environments in which code will execute. The runtimes may be packaged in various formats or filetypes. For example, a runtime may be created as a software container file, or a compressed file system image. Thus, the on-demand code execution system 110 may provision an environment with the runtime by creating an execution environment (e.g., a software container) based on the software container file or compressed file system image. Each task may reference its desired runtime within metadata of the task (e.g., within a manifest file for the task). In some instances, the on-demand code execution system 110 may implement various additional functionalities to enable efficient execution of code depending on a desired runtime or other separately submitted data objects, as discussed in detail within U.S. patent application Ser. No. 15/841,143, entitled "DEPENDENCY HANDLING IN AN ON-DEMAND NETWORK CODE EXECUTION SYSTEM" and filed on Dec. 13, 2017, the entirely of which is incorporated by reference herein.

In one embodiment, each runtime may be required by the on-demand code execution system 110 to implement a pull-based request handler, which retrieves requests to execute a task and processes the requests accordingly. By utilization of a pull-based request handler, many functionalities of the on-demand code execution system 110 may be implemented externally to a runtime, rather than requiring the runtime itself to implement such functionalities. For example, in a push-based request system (e.g., where instructions to execute a task are "pushed" to an environment provisioned with a runtime), each runtime might be required to implement their own throttling functionality, or to request provisioning of additional environments when a rate of requests exceeds a rate of processing at the environment. However, by utilizing a pull-based request handler, an environment implementing a runtime may be required simply to retrieve and process requests to execute tasks at whatever rate it is capable of, and the on-demand code execution system 110 may separately implement throttling functionalities, scaling functionalities, etc. Because the on-demand code execution system 110 may enable users or other sources to "push" requests to execute code to the system 110, the system 110 might in such instances be considered to "invert" the data flow for requests, acting as a broker to match pushed requests to execute a task with open "pulls" from request handlers in available execution environments. Moreover, as discussed in more detail below, the on-demand code execution system 110 may utilize information regarding received requests to execute code (representing "demand" for various runtimes) and open "pulls" from request handlers (representing "supply" of various runtimes) to manage proportions of various runtimes maintained at the on-demand code execution system 110. Illustratively, the on-demand code execution system 110 may implement task queues for each of a number of supported runtimes, and modify a number of execution environments provisioned with a given runtime based on a size of a task queue corresponding to the runtime or a rate of change of that task queue. Thus, the on-demand code execution system 110 may enable user-creation of any of a variety of runtimes, while maintaining efficient operation of the system 110 and with minimum requirements to the runtimes themselves.

While some functionalities are generally described herein with reference to an individual component of the on-demand code execution system 110, other components or a combination of components may additionally or alternatively implement such functionalities. For example, while a worker manager 140 may operate to record the state of executions for a given execution identifier, a frontend 140 or virtual machine instance may additionally or alternatively record such state information.

Figure 2:
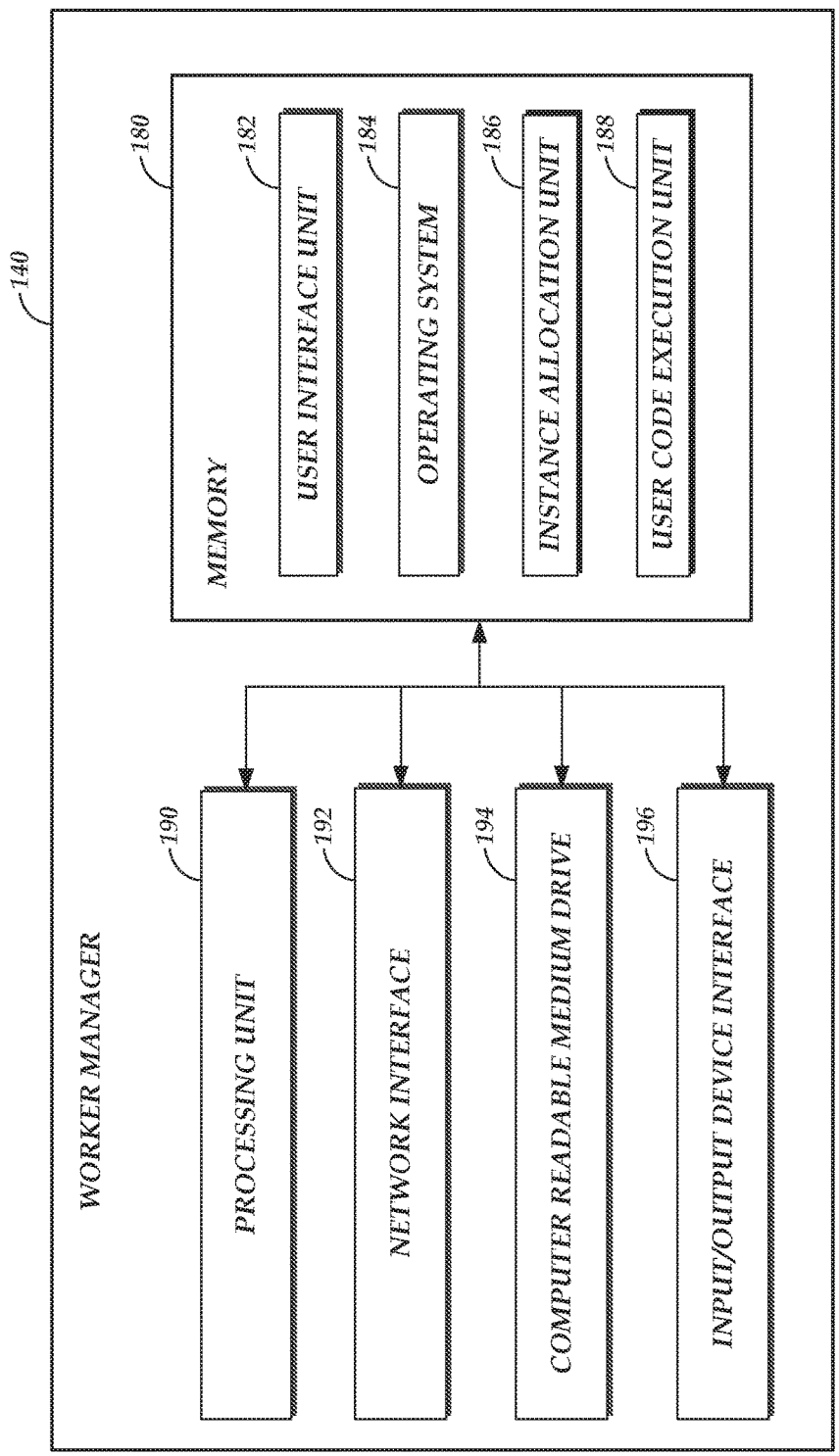
FIG. 2 depicts a general architecture of a computing device providing a worker manager that is configured to facilitate execution of tasks on the on-demand code execution system of FIG. 1.

FIG. 2 depicts a general architecture of a computing system (referenced as worker manager 140) that manages the virtual machine instances in the on-demand code execution system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find an virtual machine instance (e.g., in the warming pool 130A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances, such as based on task queues associated with a variety of different runtimes submitted to or available on the on-demand code execution system 110.

Figure 3:
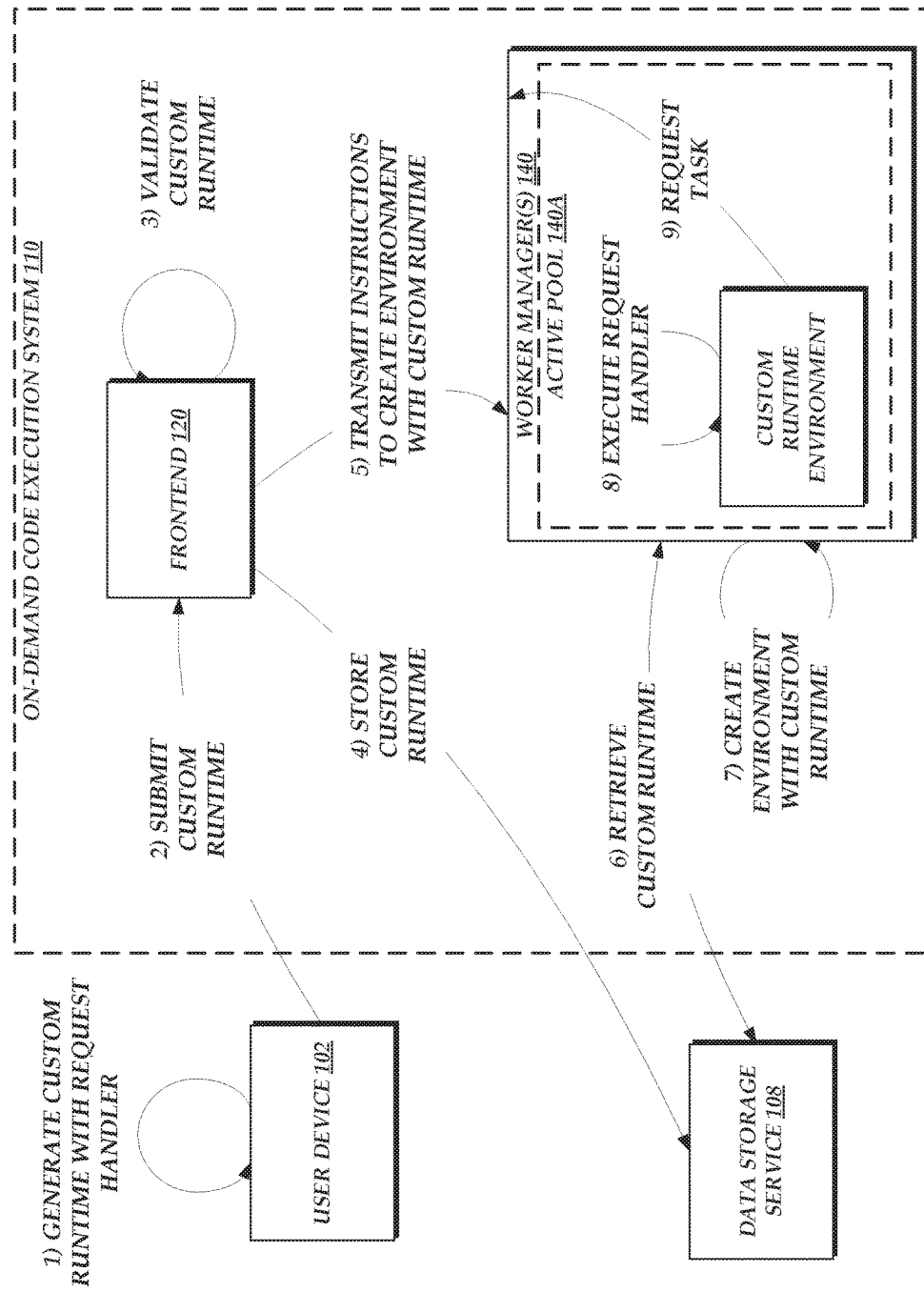
FIG. 3 is a flow diagram depicting illustrative interactions for submitting a custom runtime to the on-demand code execution system of FIG. 1.

With reference to FIG. 3, illustrative interactions are depicted for provisioning of an execution environment on the on-demand code execution system 110 with a custom runtime provided by a user device 102. The custom runtime may represent, by way of non-limiting example, software enabling execution of code within a programming language previously unsupported on the on-demand code execution system 110.

The interactions of FIG. 3 begin at (1), where the user device 102 generates the custom runtime. Illustratively, a user of the user device may create a runtime file (e.g., a software container) executable within an operating system implemented on the on-demand code execution system 110, and include within the runtime file software enabling execution of desired code (e.g., an interpreter or compiler for the code, libraries, SDKs, drivers, etc.). In the illustrative example of FIG. 3, the custom runtime further includes software enabling various functionalities of runtimes within the on-demand code execution system 110. Specifically, the runtime may include a pull-based request handler enabling the runtime (when executed) to request instructions to execute a task on the on-demand code execution system 110 and to report results of that execution. In one embodiment, the pull-based request handler is included within the runtime by including, within the runtime file, a library provided to the user device 102 by the on-demand code execution system 110. In another embodiment, the pull-based request handler is included within the runtime by including, within the runtime file, code (e.g., source code, machine code, etc.) generated by a user of the user device 102 or by a third party according to a specification provided by the on-demand code execution system 110 (e.g., a REST API specification).

Thereafter, at (2), the user device 102 submits the custom runtime to the frontend 120, for inclusion on the on-demand code execution system 110. Illustratively, the user device 102 may access an API or other interface provided by the frontend 120 for submission of custom runtimes. In some instances, the user device 102 may further specify permissions or authorizations required to access the runtime, in accordance with embodiments of the '* Application 15/841,143, incorporated by reference above. At (3), the frontend 120 validates the runtime, such as by inspecting the format of a file containing the runtime to ensure compliance with requirements for runtimes on the on-demand code execution system 110. Thereafter, at (4), the frontend 120 stores the runtime on the data storage service 108 for subsequent use on the on-demand code execution system 110**.

In addition, at (5), the frontend 120 transmits to a worker manager 140 instructions to create an execution environment provisioned with the custom runtime. While described subsequent to interaction (4), interaction (5) may occur in any order with respect to interaction (4). In some embodiments, these interactions may occur concurrently or nearly concurrently. In other embodiments, interaction (5) may occur independently of, and potentially with a significant delay after, interaction (4). For example, the frontend 120 may transmit instructions to create an environment with the custom runtime based on an expected demand for that runtime, or based on detected or predicted requests to execute tasks depending on the runtime. Illustrative mechanisms for predicting requests to execute tasks are described, for example, in U.S. patent application Ser. No. 14/971,934, entitled "PRE-TRIGGERS FOR CODE EXECUTION ENVIRONMENTS" and filed Dec. 16, 2015. In one embodiment, the instructions to create an environment with a custom runtime may be implicitly included within instructions to execute a task depending on that runtime, such that explicit instructions to create an environment with a custom runtime need not be transmitted from the frontend 120.

In response to the instructions, the worker manager 140, at (6), retrieves the custom runtime from the data storage service 108. Thereafter, at (7), the worker manager 140 generates a custom runtime environment 302 within the active pool 140A based on the custom runtime. Generation of the custom runtime environment 302 may include, for example, generation of a container based on a container file corresponding to the custom runtime, or provisioning of a container with access to a file system generated based on a compressed file system image corresponding to the runtime. The interactions of a worker manager 140 to create and provision an execution environment (e.g., a container or virtual machine instance) are described in more detail within the '556 Patent, incorporated by reference above.

As noted above, the illustrative custom runtime of FIG. 3 includes a pull-based request handler. As such, when the custom runtime is provisioned into an execution environment, resulting in the custom runtime environment 302, the custom runtime environment (e.g., by executing code corresponding to the request handler) may initiate a pull request to the worker manager 140 to obtain instructions to execute a task. In one embodiment, the pull request is an HTTP request utilizing "long polling" techniques, whereby a window for response to the request is set at a relatively long duration (e.g., on the order of minutes), such that the worker manager 140 may respond to the request when a response to the request becomes available (e.g., when the on-demand code execution system 110 receives a request to execute a task depending on the custom runtime). While the request is illustrated in FIG. 3 as directed to the worker manager 140, the request may be directed to additional or alternative components of the on-demand code execution system 110, such as the frontend 120. In one embodiment, the request is directed to a uniform resource identifier (URI) associated with a logical queue of task execution requests for the custom runtime (which URI may include, for example, an identifier of the custom runtime on the on-demand code execution system 110). Advantageously, use of such a URI may enable the on-demand code execution system 110 to redirect requests from custom runtime environments based on manipulation of network routing within the on-demand code execution system 110, and potentially without modifying the custom runtime. For example, use of a URI to direct requests for execution instructions may enable the on-demand code execution system 110 to redirect those requests by modifying domain name system (DNS) records for the URI, without otherwise altering the custom runtime or operation of the custom runtime environment 302.

Thus, by virtue of the interactions of FIG. 3, a user-defined custom runtime may be implemented within the on-demand code execution system 110, and made available to execute a task depending on that runtime.

Figure 4:
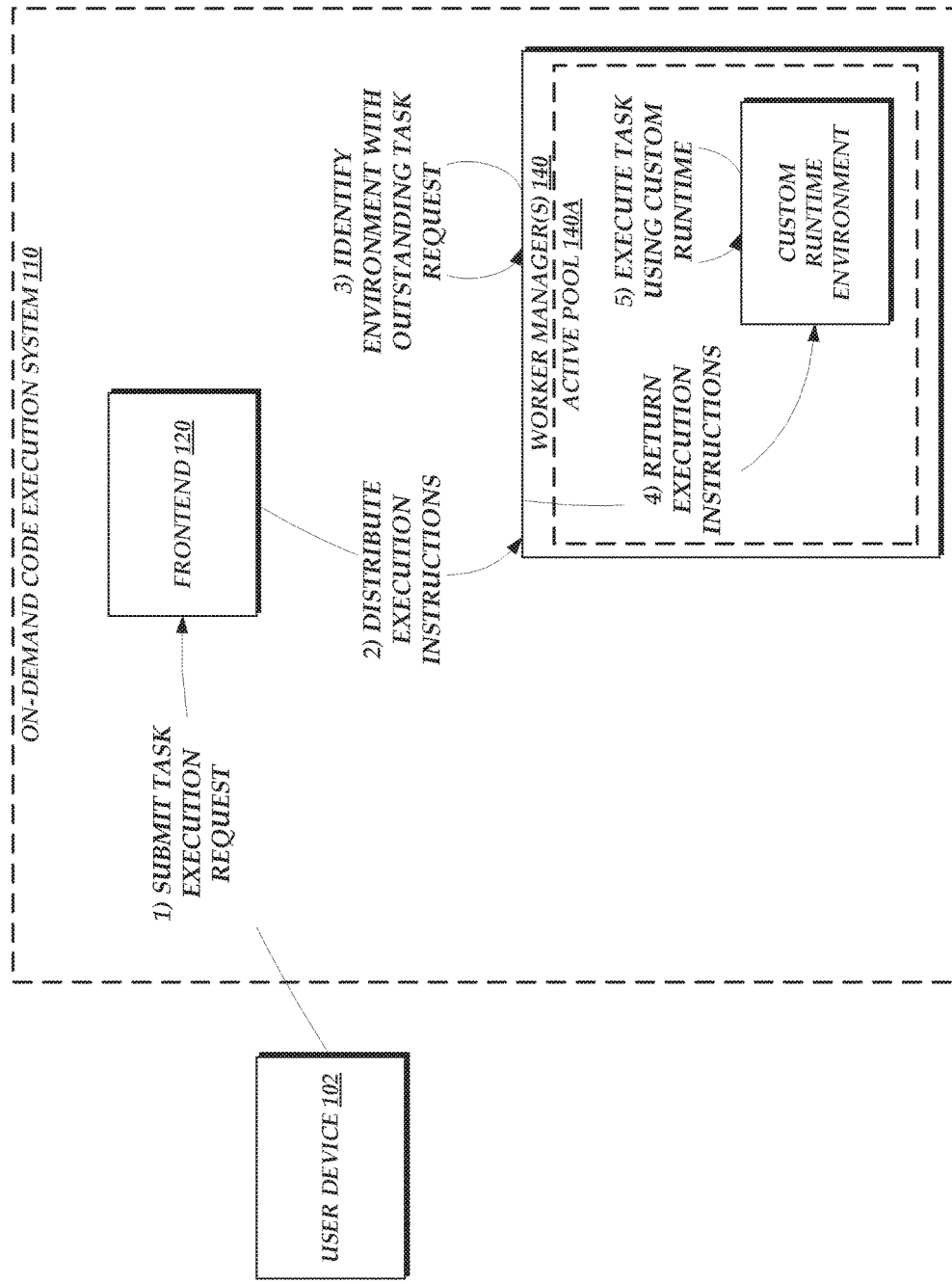
FIG. 4 is a flow diagram depicting illustrative interactions for executing a task within an environment provisioned with a custom runtime on the on-demand code execution system of FIG. 1.

With reference to FIG. 4, illustrative interactions will be described for executing a task dependent on a custom runtime within the on-demand code execution system 110. The interactions of FIG. 4 may occur, for example, subsequent to the interactions of FIG. 3. Thus, reference numerals of FIG. 3 are maintained within FIG. 4. However, one skilled in the art will appreciate, in light of the present disclosure, that the interactions of FIG. 4 may also occur independently of the interactions of FIG. 3.

The interactions of FIG. 4 begin at (1), where the user device 102 submits a request to the frontend 120 to execute a task. While transmission of an execution request is shown in FIG. 4 as generated at a user device 102, task execution requests may additionally or alternatively be submitted by other sources, such as third-party devices or a device of the on-demand code execution system 110.

At (2), the frontend 120 determines dependencies for the task. Illustratively, the frontend 120 may identify a manifest for the task, and inspect the manifest to determine a runtime associated with execution of the task. Illustrative mechanisms for determining dependencies of a task are described in more detail within the '* Application 15/841,143, incorporated by reference above. For purposes of the present description, it will be assumed that the task for which execution is requested depends on the custom runtime of FIG. 3**, and thus should be executed within an environment provisioned with the custom runtime.

At (3), the frontend 120 distributes to a worker manager 140 instructions to execute the task identified within the request. In one embodiment, the on-demand code execution system 110 includes multiple worker managers 140, and the frontend 120 is configured to distribute requests dependent on a given runtime to a given set of one or more frontends 120. Illustratively, the frontend 120 may be configured to apply a consistent hashing algorithm to an identifier of the runtime, and to distribute instructions to execute the task based on a result of that hashing algorithm. Consistent distribution of requests may enable more efficient operation of the on-demand code execution system 110, for example, by increasing the likelihood that execution environments within an active pool 140A of the worker manager 140 may be reused, reducing the likelihood that information (such as a file representing a runtime) must be transferred over a network to the active pool 140A, etc. In another embodiment, the frontend 120 may distribute execution instructions in other manners, such as by load balancing requests across worker managers 140, randomly distributing requests, or the like.

At (3), the worker manager 140 identifies an environment provisioned with an appropriate runtime to execute the task, and for which an outstanding request for execution instructions exist. In the instance that no environment is identified at interaction (3) (e.g., because all appropriate environments are busy executing other tasks), the worker manager 140 may place the task execution instructions into a queue associated with the runtime. The queue may operate on a first-in-first-out (FIFO) basis, such that when the task execution instructions reach the head of the queue, they are return to a next appropriate environment that submits a request for execution instructions to the worker manager 140.

For the purposes of description of FIG. 4, it will be assumed that custom runtime environment 302 is identified at interaction (3), either immediately or after being processed through a queue, as described above. Thus, the worker manager 140, at (4), returns to the custom runtime environment 302, as a response to the prior request for execution instructions, instructions to execute the task as identified within the request of the user device 102. Illustratively, the response provided by the worker manager 140 may include an identifier of the execution request, or details of the request, such as an identifier of the task, parameters passed within the request, or the like. As noted above, the response may be formatted as a transmission of a REST-compliant API.

At (5), the custom runtime environment 302, based on software included within the custom runtime, executes the task, thus fulfilling the request of the user device 102. Execution of tasks may include a number of functionalities, such as retrieving details of the task execution (e.g., via the REST-compliant AP), provisioning the custom runtime environment 302 with code of additional dependencies, and initiating execution of code corresponding to the task. Execution of code within an environment of the on-demand code execution system 110 is described in more detail within the Ser. No. 15/841,143 Application, incorporated by reference above.

Figure 5:
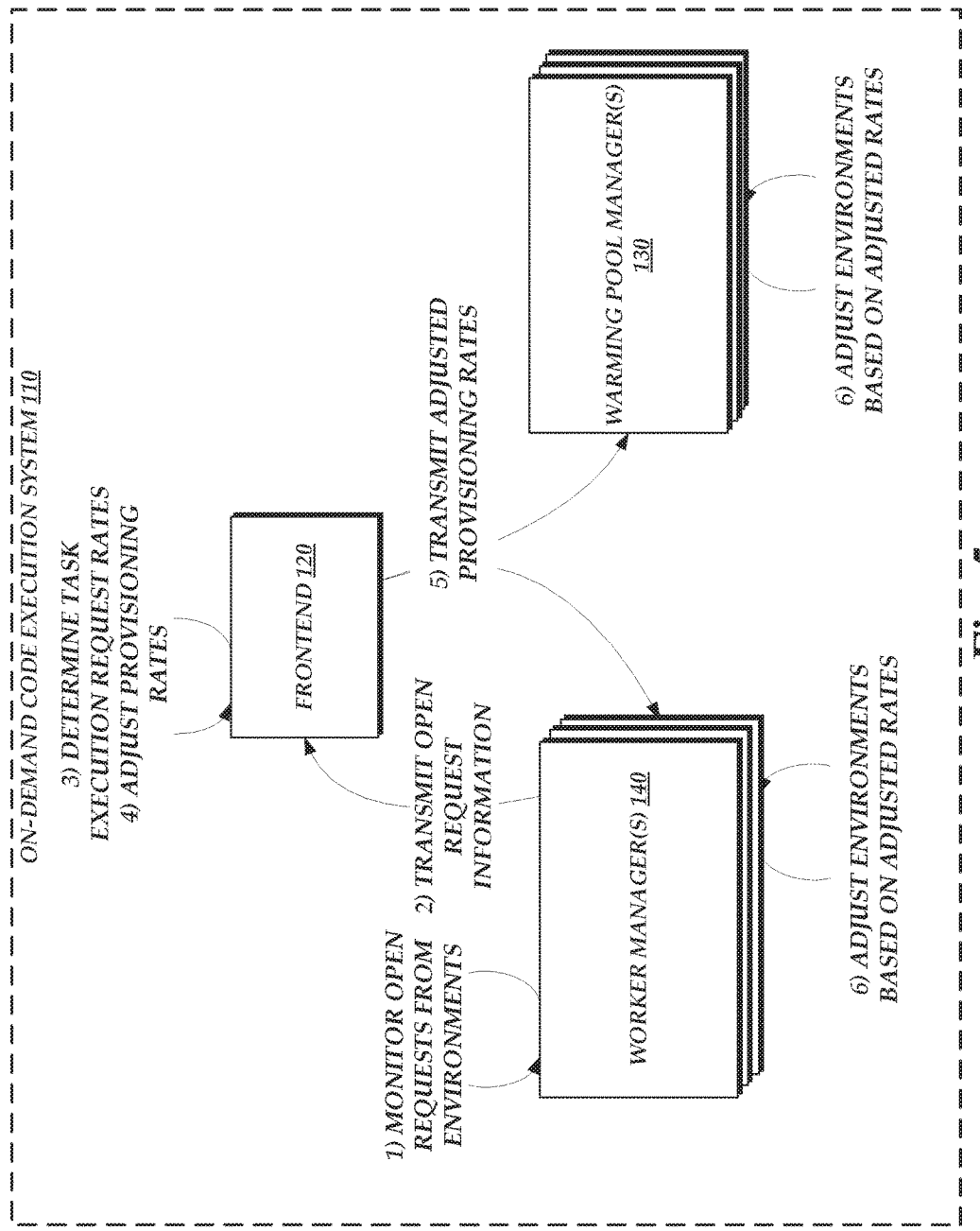
FIG. 5 is a flow diagram depicting illustrative interactions for modifying provisioning of environments on the on-demand code execution system of FIG. 1 with runtimes based on queue depths corresponding to the runtimes.

With reference to FIG. 5, illustrative interactions will be described for managing a distribution of runtimes to execution environments of the on-demand code execution system 110 based on queues associated with each runtime. As noted above, in some embodiments, worker manager 140 may implement queues corresponding to each runtime associated with the worker manager 140 (e.g., by consistent hashing of an identifier of the runtime). Accordingly, a queue depth (e.g., a number of execution instructions) within a queue for a runtime may indicate a demand for the runtime, usable (by itself or in conjunction with other information) to manage rates of provisioning execution environments on the on-demand code execution system 110 with the runtime. As such, in the interactions of FIG. 5, each of the worker managers 140, at (1), monitors a queue depth for one or more runtimes associated with the worker manager 140 and, at (2), transmits the queue depth information to the frontend 120.

At (3), the frontend 120 may adjust the provisioning rates of execution environments with runtimes based on the queue depth information. In one embodiment, the frontend 120 may attempt to maintain equal queue depths among queues for different runtimes. As such, where a queue depth for a first runtime exceeds that of a second runtime, the frontend 120 may determine that more execution environments may be provisioned with the first runtime, while fewer should be provisioned with the second runtime. In one embodiment, the proportion of environments provisioned with a runtime may be proportional to the queue depth for the runtime, relative to all queued execution instructions on a worker manager 140. Thus, for example, if a queue for a given runtime represented 25% of all outstanding execution requests, the frontend 120 may determine that, at the worker manager 140, 25% of execution environments should be provisioned with the given runtime. In other embodiments, the frontend 120 may attempt to maintain queue depths within threshold limits (e.g., a maximum depth, a minimum depth, or a combination thereof). Thus, the frontend 120 may determine that where a queue depth exceeds these limits, execution environments provisioned with a runtime corresponding to the queue should be modified accordingly (e.g., by increasing provisioning in the case of excessive depth or decreasing provisioning in the case of low depth). In one embodiment, a threshold may be set for the average queue depth, such that the on-demand code execution system attempts to maintain an average queue depth (e.g., across all runtimes currently provisioned into execution environments) at the threshold value (e.g., one). Where the average queue depth diverges from the desired value, environments may be modified to maintain the desired average depth, such as by destroying runtimes provisioned with under-utilized runtimes (e.g., with queue depths under the desired value) or provisioning additional runtimes with heavily used runtimes (e.g., with queue depths over the desired value). In some instances, different threshold metrics may be established for different types of queues. For example, in one embodiment, different queues are maintained for a given runtime based on a source of a request to execute a task for the runtime (e.g., originating from an API call, originating from a given auxiliary service, originating from the on-demand code execution system 110, etc.). Each queue may be associated with different threshold metrics based on a desired execution time frame, as determined from the source of requests corresponding to the queue. For example, API calls may be associated with a low threshold queue depth, indicating that requests to execute tasks received through an API call are expected to execute quickly. Requests from a given auxiliary service may be associated with a higher threshold queue depth, indicating that requests to execute tasks received from the auxiliary service may not be as time-sensitive to fulfill as requests received through an API call. In some instances, users may specific or modify threshold metrics for queues. Illustratively, where queues for a runtime are maintained on a per-task or per-user basis, the user corresponding to the queue may specify threshold metrics for the queue.

In some instances, capacity for one or more environments (e.g., compute capacity on a device or virtual machine instance) may be maintained as unutilized, in order to provide capacity to increase or decrease provisioning for a runtime independent of provisioning for other runtimes. In other instances, a given runtime may be maintained as a default runtime, such that a reduction in provisioning rates for other runtimes results in an increase in provisioning rates for the default runtime. In still other instances, provisioning of runtimes may be zero-sum, such that the frontend 120 allocates all or substantially all capacity among available runtimes (e.g., proportional to their queue depth).

In some embodiments, the frontend 120 may additionally or alternatively determine provisioning rates for environments within warming pools. For example, the frontend 120 may increase the number of environments within a warming pool provisioned with a runtime corresponding to a high depth queue, while decreasing the number of environments within the warming pool provisioned with a runtime corresponding to a lower queue depth. In some instances, provisioning rates for either or both active pools or warming pools may also be altered based on a rates of requests for execution of tasks depending on a given runtime. For example, the frontend 120 may increase provisioning of environments with a given runtime where the rate of requests for execution of tasks depending on the runtime increases relatively to prior rates of requests, even where the queue depth corresponding to the runtime is low. Thus, the rate of change for requests depending on a given runtime may, in addition to or as an alternative to queue depths, be used to modify provisioning rates of environments within the runtime.

After determining provisioning rates, the frontend 120, at (5), transmits the adjusted provisioning rates to the worker manages 140 and warming pool managers 130, as necessary. The worker manages 140 and warming pool managers 130, in turn, adjust the rate of provisioning based on the adjusted rate. Thus, the number of environments provisioned with runtimes can be altered based on queue depth for that runtime, representing a number of requests to execute tasks depending on that runtime relative to a number of pull-based requests for execution instructions corresponding to the runtime.

While some interactions of FIG. 5, such as a determining of provisioning rates for different runtimes, are described as performed by the frontend 120, these interactions may additionally or alternatively be performed by other elements of the on-demand code execution system 110. For example, in one embodiment, the worker managers 140 may independently or collectively determine provisioning rates for runtimes with each worker manager 140, without necessarily requiring interaction with the frontend 120. Moreover, as noted above, it may be advantageous in some instances for the on-demand code execution system 110 to divide functionalities for managing a volume of compute capacity (e.g., available virtual machine instances, container environments, etc.) and functionalities for managing provisioning of that compute capacity with various software, such as runtimes. Thus, in some embodiments, the interactions of FIG. 5 may occur independently of functionality for managing compute capacity on the on-demand code execution system 110 (e.g., by adding new devices or virtual machine instances).

Figure 6:
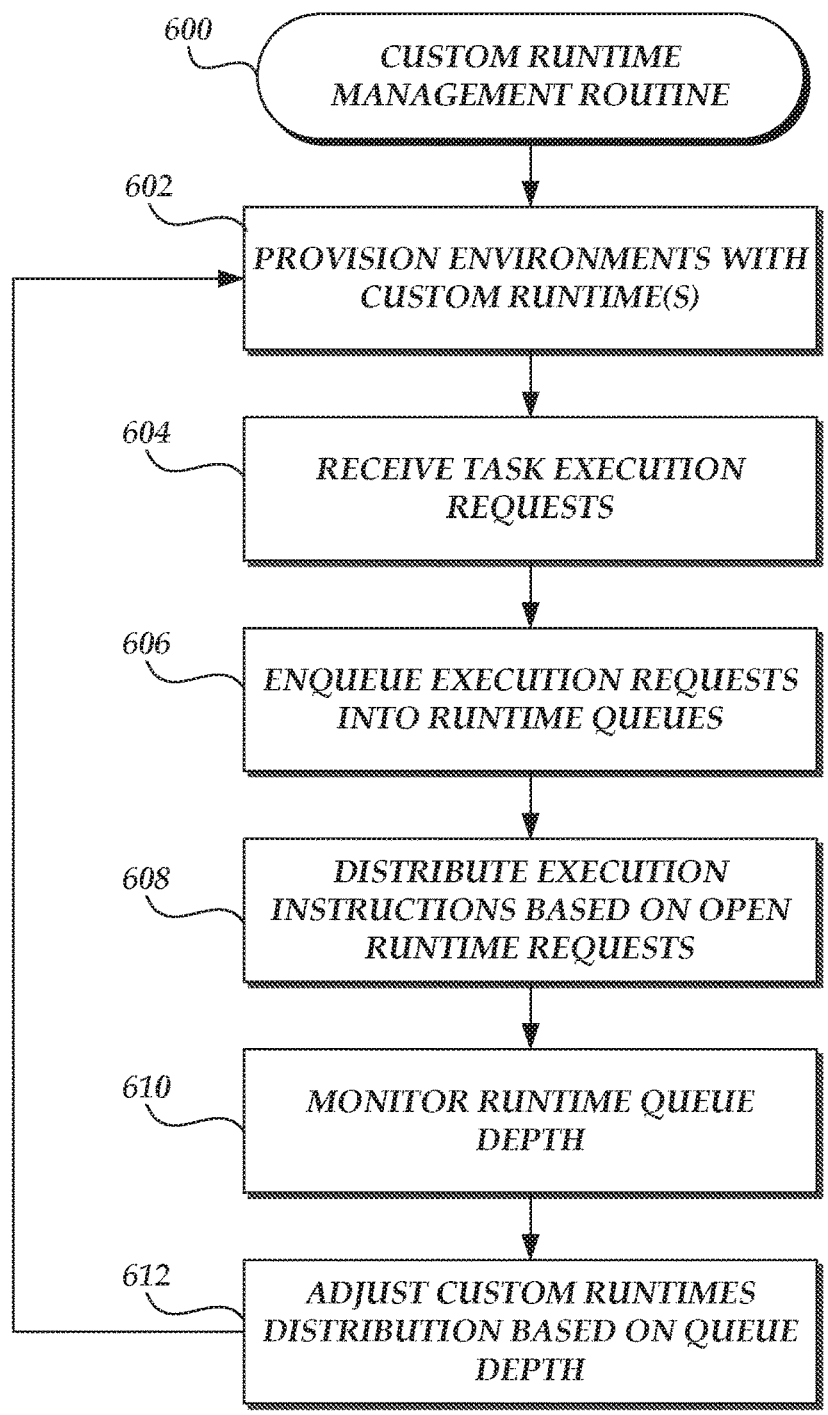
FIG. 6 is a flow chart depicting an illustrative routine for managing custom runtimes on the on-demand code execution system of FIG. 1.

With reference to FIG. 6, an illustrative routine 600 will be described to manage custom runtimes within an on-demand code execution system, such as the on-demand code execution system 110. The routine 600 may be carried out, for example, by a worker manager 140 of the on-demand code execution system 110 (independently or in conjunction with other elements, such as the frontend 120).

The routine 600 begins at 602, where the worker manager 140 provisions one or more execution environments (e.g., software containers, virtual machines, devices, etc.) with a custom runtime, which may be provided by a user of the on-demand code execution system 110. In accordance with embodiments of the present disclosure, the custom runtime may contain code that, when executed within an environment, implements a pull-based request handler, enabling distribution of execution instructions to the environment while minimizing a need for the environment to manage functionalities such as execution distribution on the on-demand code execution system 110. In one embodiment, provisioning of an environment with a runtime may include creating the environment (e.g., creating a container or virtual machine instance) and providing the environment with access to the custom runtime (e.g., as part of a filesystem for the environment). The environment may illustratively be provisioned prior to receiving a request to execute a task within the environment, such that execution of tasks may occur rapidly in response to such a request.

At block 604, the worker manager 140 receives one or more task execution instructions. As noted above, the instructions may be generated based on requests received from a variety of sources, such as user computing devices 102, other computing devices, or the on-demand code execution system 110 itself. The instructions may include information such as an identifier of the task to be executed and parameters under which to execute the task.

At block 606, the worker manager 140 enqueues the instructions into runtime queues appropriate to the instructions. Illustratively, the worker manager 140 may identify, for each instruction, a runtime on which the task to be executed depends (e.g., based on metadata of the task). The worker manager 140 may then enqueue the instruction into a queue corresponding to that runtime.

At block 608, the worker manager 140 distributes the execution instructions to environments based on open instructions requests from the environment. For example, as noted above, each runtime may include code that, when executed within an environment, causes the environment to generate requests for execution instructions to the worker manager 140 (or other endpoint within the on-demand code execution system 110). The request may be formatted in accordance with a commonly implemented standard, such as the HTTP protocol, and comply with a specification defined by the on-demand code execution system 110, such as a REST-compliant API. Thus, in response to each instruction request from an environment, the worker manager 140 can transmit instructions to execute a task appropriate for the environment. In this way, the worker manager 140 may act as a broker between requests to execute tasks, which may stem from outside execution environments, and requests for instructions to execute tasks stemming from the execution environments themselves.

At block 610, the worker manager 140 monitors the queue depths of the various runtimes, such as to ensure that the queue depths are maintained within threshold values (e.g., absolute threshold values, threshold values relative to one another, etc.). Thereafter, at block 612, the worker manager 140 adjust the provisioning of runtimes to execution environments based on the monitored queue depths. For example, the worker manager 140 may increase the number or proportion of environments provisioned with runtimes corresponding to high queue depths, decrease the number or proportion of environments provisioned with runtimes corresponding to low queue depths, or a combination thereof. Thus, where many tasks depending on a given runtime are awaiting execution, the proportion of environments provisioned with that runtime can be increased. In some embodiments, the worker manager 140 modifies proportions of execution environments within an active pool under control of the worker manager 140. In other embodiments, the worker manager 140 additionally or alternatively modifies proportions of execution environments within a warming pool (e.g., under control of a warming pool manager 130), and communicates modifications to those proportions to the warming pool manager 130. In still other embodiments, an alternative element of the on-demand code execution system 110, such as the frontend 120, determines target distributions of runtimes among available execution environments, and notifies the worker manager 140 of these proportions, after which the worker manager 140 may adjust provisioning of environments in order to comply with the target distributions. As noted above, in one embodiment, the adjustment of provisioning of runtimes into environments may occur independently of managing the total number of environments managed by the worker manager 140 (e.g., in order to increase efficiency in managing the number of environments and to reduce the complexity of management of the on-demand code execution system 110).

Thereafter, the routine 600 returns to block 602, as described above. The routine 600 may then continue to loop during operation of the on-demand code execution system 110. Thus, by implementation of the routine 600, the on-demand code execution system 110 is enabled to provide execution environments provisioned with any number of potential runtimes, substantially expanding the ability of the on-demand code execution system 110 to execute user-specified code in a rapid manner.

One skilled in the art will appreciate, in light of the present disclosure, that ordering or arrangement of blocks within the routine 600 may vary across embodiments of the present disclosure. For example, while described as a single routine, blocks described above may be implemented in two or more separate routines, executing in conjunction or independently from one another. Illustratively, blocks 602 through 608 may be implemented as a first routine, while blocks 610 and 612 are implemented as a second routine. Other variations are possible within the scope of the present disclosure.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a non-transitory data store including a plurality of runtimes, individual runtimes including software that, when provisioned into an execution environment on an on-demand code execution system, enable execution of user-submitted code within the execution environment;
one or more computing devices providing a plurality of execution environments of the on-demand code execution system;
a computing device implementing a management system, wherein the management system is configured to:
provision individual execution environments, of the plurality of execution environments, with a runtime from the plurality of runtimes;
maintain instruction queues for individual runtimes of the plurality of runtimes, wherein an instruction queue for an individual runtime enqueues one or more execution instructions awaiting distribution to an execution environment provisioned with the individual runtime, an execution instruction corresponding to an instruction to execute user-submitted code within an individual execution environment;
determine, based at least partly on a number of execution instructions within the instruction queue for a first runtime of the plurality of runtimes, a number of the plurality of execution environments to be provisioned with the first runtime; and
modify provisioning of the individual execution environments to cause the determined number of execution environments to be provisioned with the first runtime.

2. The system of claim 1, wherein the software of the individual runtimes comprises at least one of an interpreter, a compiler, a library, a software development kit, or a driver.

3. The system of claim 1, wherein the plurality of runtimes includes at least a first runtime enabling execution of code of a first programming language and a second runtime enabling execution of code within a second programming language.

4. The system of claim 1, wherein the first runtime is submitted to the on-demand code execution system by an end user of the on-demand code execution system.

5. The system of claim 1, wherein the individual execution environments, when provisioned with a runtime of the plurality of runtimes, are configured to transmit to the management system requests for execution instructions.

6. A computer-implemented method comprising:
provisioning individual execution environments, of a plurality of execution environments in an on-demand code execution system, with a runtime from a plurality of runtimes maintained at the on-demand code execution system, wherein individual runtimes include software that, when provisioned into an execution environment of the plurality of execution environments, enable execution of user-submitted code within the execution environment;
maintaining instruction queues for individual runtimes of the plurality of runtimes, wherein an instruction queue for an individual runtime enqueues one or more execution instructions awaiting distribution to an execution environment provisioned with the individual runtime, an execution instruction corresponding to an instruction to execute user-submitted code within an individual execution environment;
determining, based at least partly on a number of execution instructions within an instruction queue of a first runtime, of the plurality of runtimes, a number of the plurality of execution environments to be provisioned with the first runtime; and
modifying provisioning of the individual execution environments to cause the determined number of execution environments to be provisioned with the first runtime.

7. The computer-implemented method of claim 6, wherein the individual execution environments, when provisioned with a runtime of the plurality of runtimes, are configured to transmit to the management system requests for execution instructions, and wherein the method further comprises:
receiving a request for execution instructions from an execution environment provisioned with the first runtime;
identifying an execution instruction within the instruction queue for the first runtime;
transmitting the execution instruction to the execution environment provisioned with the first runtime; and
dequeue the execution instruction from the instruction queue for the runtime.

8. The computer-implemented method of claim 7, wherein the request is formatted according to the hypertext transmission protocol (HTTP).

9. The computer-implemented method of claim 7 further comprising implementing an application programming interface (API) through which the request is received.

10. The computer-implemented method of claim 9, wherein the API implements a representational state transfer (REST) architecture.

11. The computer implemented method of claim 7, wherein the instruction queues are maintained at at least a first computing device of the on-demand code execution system, and wherein the method further comprises routing the execution instruction to the first computing device based on applying a consistent hashing algorithm to an identifier of the identified runtime.

12. The computer implemented method of claim 6, wherein determining the number of the plurality of execution environments to be provisioned with the first runtime comprises:

determining that the number of execution instructions within the instruction queue of the first runtime exceeds a threshold value; and determining an increase in the number of the plurality of execution environments to be provisioned with the first runtime.

13. The computer implemented method of claim 9, wherein the threshold value is at least one of an absolute threshold value or a threshold value relative to the number of execution instructions within one or more other instructions queues.

14. Non-transitory computer-readable media comprising computer-executable instructions that, when executed by a computing system, cause the computing system to:

maintain instruction queues for individual runtimes of a plurality of runtimes in an on-demand code execution system, wherein an instruction queue for an individual runtime enqueues one or more execution instructions awaiting distribution to an execution environment, among a plurality of execution environments on the on-demand code execution system, provisioned with the individual runtime, the one or more execution instructions corresponding to instructions to execute user-submitted code within the execution environment, wherein individual runtimes include software that, when provisioned into the execution environment, enable execution of user-submitted code within the execution environment;

determine, based at least partly on a number of execution instructions within an instruction queue of a first runtime of the plurality of runtimes, a number of the plurality of execution environments to be provisioned with the first runtime; and cause the determined number of execution environments to be provisioned with the first runtime.

15. The non-transitory computer-readable media of claim 14, wherein causing the determined number of execution environments to be provisioned with the first runtime comprises causing a reduction in the number of execution environments provisioned with a second runtime.

16. The non-transitory computer-readable media of claim 14, wherein the instructions further cause the computing system to identify the second runtime based at least in part on the instruction queue of the second runtime.

17. The non-transitory computer-readable media of claim 14, wherein causing the determined number of execution environments to be provisioned with the first runtime comprises causing a reduction in the number of execution environments provisioned with a second runtime.

18. The non-transitory computer-readable media of claim 14, wherein determining the number of the plurality of execution environments to be provisioned with the first runtime comprises:

determining that the number of execution instructions within the instruction queue of the first runtime is lower than a threshold value; and determining a decrease in the number of the plurality of execution environments to be provisioned with the first runtime.

19. The non-transitory computer-readable media of claim 14, wherein the instructions further cause the computing system to manage a number of execution environments, within the plurality of execution environments, independently of provisioning the plurality of execution environments with runtimes of the plurality of runtimes.

20. The non-transitory computer-readable media of claim 14, wherein the instructions further cause the computing system to generate the plurality of execution environments.

* * * * *

UNITED STATES PATENT AND TRADEMARK OFFICE
CERTIFICATE OF CORRECTION

PATENT NO. : 10,303,492 B1
APPLICATION NO. : 15/841132
DATED : May 28, 2019
INVENTOR(S) : Timothy Allen Wagner It is certified that error appears in the above-identified patent and that said Letters Patent is hereby corrected as shown below:

In the Specification

In Column 24, Line 14, change "'*** Application" to --Application--.

In Column 25, Line 51, change "'*** Application" to --Application--.

Signed and Sealed this
First Day of October, 2019

Andrei Iancu
*Director of the United States Patent and Trademark Office*